United States Patent
Setina

(10) Patent No.: US 8,708,388 B2
(45) Date of Patent: Apr. 29, 2014

(54) PARTITION PROVIDING INCREASED LEGROOM

(71) Applicant: Terry L. Setina, Olympia, WA (US)

(72) Inventor: Terry L. Setina, Olympia, WA (US)

(*) Notice: Subject to any disclaimer, the term of this patent is extended or adjusted under 35 U.S.C. 154(b) by 0 days.

(21) Appl. No.: 13/714,337

(22) Filed: Dec. 13, 2012

(65) Prior Publication Data
US 2013/0147221 A1 Jun. 13, 2013

Related U.S. Application Data

(60) Provisional application No. 61/570,233, filed on Dec. 13, 2011.

(51) Int. Cl.
*B60R 21/12* (2006.01)

(52) U.S. Cl.
USPC .................. 296/24.4; 296/24.42; 280/749

(58) Field of Classification Search
USPC ......... 296/24.4, 24.42, 24.43, 24.46; 280/749
See application file for complete search history.

(56) References Cited

U.S. PATENT DOCUMENTS

| | | | | |
|---|---|---|---|---|
| 3,015,515 A * | 1/1962 | Halstead et al. | ............ | 296/24.42 |
| 3,547,217 A * | 12/1970 | Garza | ............ | 180/286 |
| 4,015,875 A * | 4/1977 | Setina | ............ | 296/24.46 |
| 4,035,014 A * | 7/1977 | Sellers | ............ | 296/24.46 |
| 4,173,369 A * | 11/1979 | Roggin | ............ | 296/24.46 |
| 4,595,227 A | 6/1986 | Setina | | |
| 4,621,856 A * | 11/1986 | McKenzie | ............ | 296/24.4 |
| 4,964,666 A * | 10/1990 | Dillon | ............ | 296/24.46 |
| 4,971,378 A * | 11/1990 | Setina | ............ | 296/24.46 |
| 5,058,941 A * | 10/1991 | Solomon et al. | ............ | 296/24.46 |
| 5,511,842 A * | 4/1996 | Dillon | ............ | 296/24.42 |
| 5,536,057 A * | 7/1996 | Stewart | ............ | 296/24.46 |
| 5,683,021 A | 11/1997 | Setina | | |
| 6,827,382 B2 * | 12/2004 | Murray et al. | ............ | 296/24.46 |
| 6,983,969 B2 * | 1/2006 | Murray et al. | ............ | 296/24.4 |
| 7,195,297 B2 * | 3/2007 | Murray et al. | ............ | 296/24.4 |
| 7,726,688 B2 * | 6/2010 | Setina | ............ | 280/748 |
| 7,806,452 B2 * | 10/2010 | Storer et al. | ............ | 296/24.43 |
| 2007/0176450 A1 * | 8/2007 | Setina | ............ | 296/24.46 |
| 2013/0113232 A1 * | 5/2013 | Sage | ............ | 296/24.46 |
| 2013/0147221 A1 * | 6/2013 | Setina | ............ | 296/24.42 |

OTHER PUBLICATIONS

Jotto Desk, "Space Creator Vehicle Partitions," Spec Guide 2011—Section Edition.

* cited by examiner

*Primary Examiner* — Glenn Dayoan
*Assistant Examiner* — Gregory Blankenship
(74) *Attorney, Agent, or Firm* — Klarquist Sparkman, LLP

(57) ABSTRACT

A partition for separating front and rear occupant areas of a vehicle comprising at least one partition member and at least one pair of partition support brackets. The partition bracket has an upper extent comprising a near ceiling member positionable adjacent a ceiling of the vehicle and two lateral extents comprising opposite side members. The partition support brackets are mountable to opposite sides of the vehicle and to the opposite side members of the partition member to couple the partition to the vehicle. The partition support bracket for at least one of the opposite sides comprises a load support section configured to support a proportion of a partition member load as applied to the at least one of the sides.

18 Claims, 7 Drawing Sheets

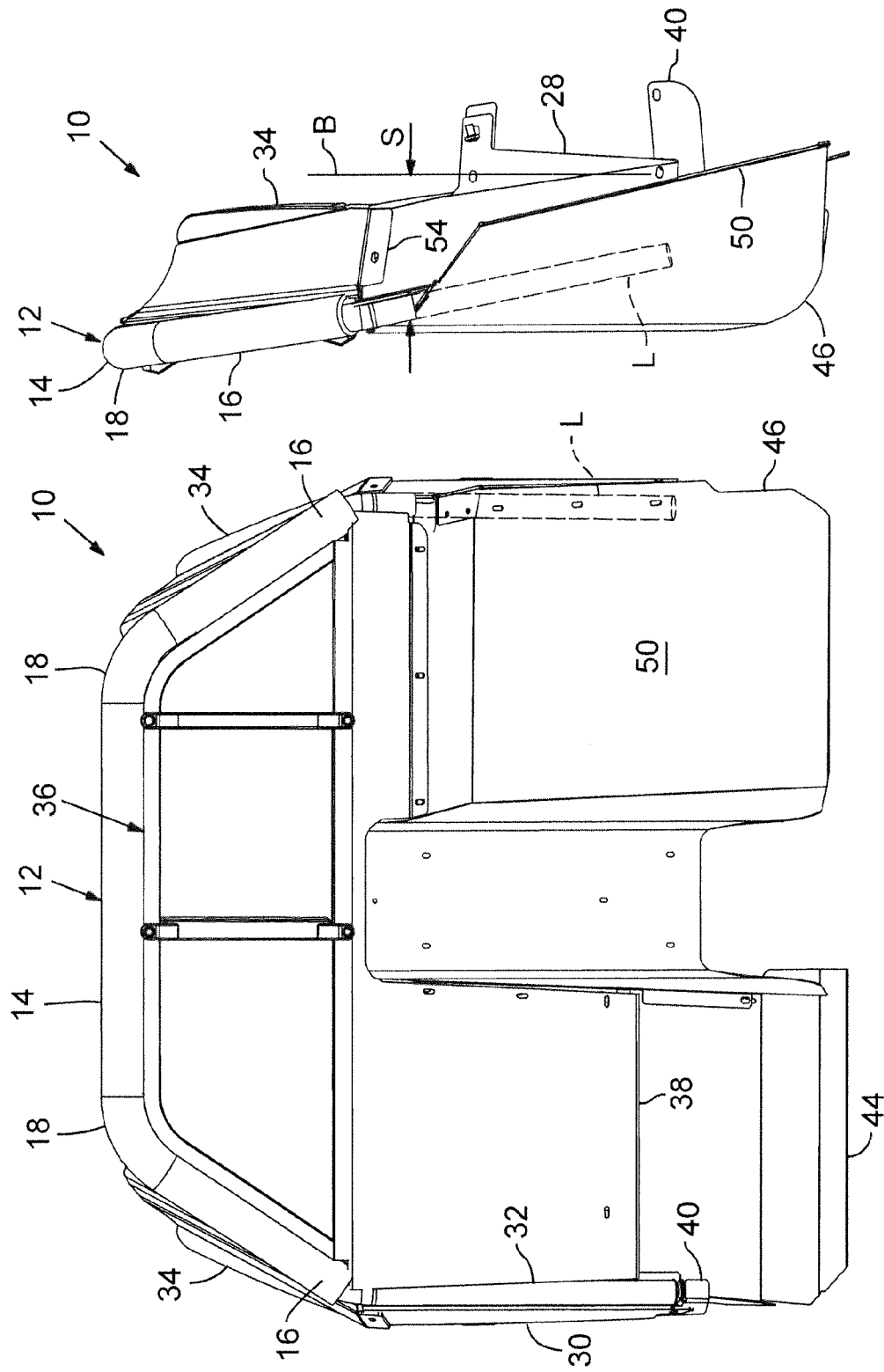

PARTITION PROVIDING INCREASED LEGROOM

CROSS REFERENCE TO RELATED APPLICATION

This application claims the benefit of U.S. Provisional Patent Application No. 61/570,233, filed Dec. 13, 2011, which is hereby incorporated by reference.

BACKGROUND

Partitions for passenger vehicles are used to separate the interior space for different uses. According to one common type of partition used in law enforcement vehicles, the rear seat area (typically suited for two passengers) is separated from the front seat area (typically suited for a driver and a passenger) by a partition. This type of partition separates one or two law enforcement officers seated in the front seat area from one, two or sometimes three rear seat occupants, such as suspects and other individuals, thereby reducing the risks of injury to the law enforcement officers from the rear seat occupants, as well as restricting the ability of the rear seat occupants to escape from the vehicle.

Law enforcement officers spend many hours in their vehicles each day, so vehicle partition mounting schemes that provide a full range of front seat adjustment, both in terms of fore-aft translation of the seat and pivoting of the seat back, are highly sought after. At the same time, however, law enforcement vehicles are becoming smaller because of the need for greater fuel economy. In addition, rear seat legroom is also compromised in today's newest vehicle models that are used in law enforcement. In some cases, it is necessary to compromise and provide for full adjustability of the driver's seat and less adjustability of the front passenger seat while also seeking to maximize the available rear seat legroom within a number of constraints. It would be beneficial to maintain or increase the free area available to rear seat occupants for ingress into and egress from the vehicle.

SUMMARY

Described below are implementations of a partition that address some of the problems of conventional partitions.

According to one implementation, a partition for separating front and rear occupant areas of a vehicle comprises at least one partition member and at least one pair of partition support brackets. The partition member has an upper extent comprising a near ceiling member positionable adjacent a ceiling of the vehicle and two lateral extents comprising opposite side members. The pair of partition brackets is mountable to opposite sides of the vehicle and to the opposite side members of the partition member to couple the partition to the vehicle. The partition support bracket for at least one of the opposite sides comprises a load support section configured to support a proportion of a partition member load as applied to that side.

The at least one bracket can comprise an internal bracket component and an external bracket component. The internal bracket component can be configured to be mounted to a pillar of the vehicle. The external bracket can be configured for coupling to the internal bracket component. The internal bracket component and the external bracket component can together define an intermediate space dimensioned to receive a trim panel for the pillar of the vehicle. The internal bracket component can comprise screw bosses for receiving threaded fasteners to couple the external bracket component to the internal bracket component. The screw bosses can be dimensioned to maintain a space between the internal bracket component and the external bracket component.

The partition support bracket can be a sole load supporting member for partition member forces and other associated forces carried by the respective side of the vehicle. Each of the pair of the partition support brackets can be a sole load supporting member to transfer forces exerted by the partition to the respective side of the vehicle. The partition support bracket can have a generally planar cross-section.

At least one of the side members of the partition member can be dimensioned to terminate at a height above a knee height when the partition is installed in a vehicle. Stated differently, the partition member can be "legless" on at least one side. In another implementation, the side members of the partition member extend away from the near ceiling member, and both are dimensioned to terminate above a knee height as defined by a typical seated rear seat occupant's knees when the partition is installed in a vehicle.

The internal bracket component can be configured for mounting to a B-pillar of the vehicle. At least one of the pair of support brackets can define a large opening therein. The internal bracket component can be comprised of two separate pieces. The internal bracket component can comprise a body and out turned flanges. The load support section of the at least one of the partition support brackets can be shaped to extend over a space between a side surface of the vehicle and the partition member when the partition is installed in the vehicle.

The at least one of the support brackets can be configured to maintain an open feet access area when the partition is installed to ease ingress and egress through a door opening for a rear seat occupant. The at least one of the support brackets can be configured to support the partition frame spaced rearward of a B-pillar of the vehicle by a greatest distance of about 4 inches to about 6 inches when the partition is installed in the vehicle.

In another implementation, a partition for separating two-passenger front and multiple-passenger rear occupant areas of a vehicle comprises a partition frame, one or more panel members and a tubular extension. The partition frame has an upper lateral member, respective angled side tubular members extending from ends of the upper lateral member, and a window bordered by the upper lateral member and the side members. The one or more panel members are configured to fit between the window and a floor pan of the vehicle in a vertical direction and between first and second sides of the vehicle in a horizontal direction. The tubular extension is positionable to support one of the angled side tubular members for positioning adjacent the first side of the vehicle. The tubular extension has a lower end configured for coupling to a midsection of the vehicle. A first of the body panel members is positionable adjacent the tubular extension and generally defines a first body member plane approximately parallel to a reference plane defined by the tubular extension and the window. There is at least a second body panel member positionable laterally adjacent the first body panel member and for positioning adjacent the second side of the vehicle. The second body panel member has a recessed portion recessed in a forward direction relative to the first body panel to increase space available for a rear seat occupant on the second side of the vehicle.

The recessed portion can comprise a foot well having a further recessed portion sized to accommodate at least a portion of a rear seat occupant's feet. In some implementations, there is no tubular extension positionable to support the other of the angled side tubular members for positioning adjacent the second side of the vehicle.

The partition can be configured for withstanding loads applied to the partition and transmitted through the brackets to the vehicle by connections to the vehicle's midsection at heights above a floor level of the vehicle. The partition can be configured for attachment to the vehicle's B-pillars.

These and other implementations are described below in greater detail.

BRIEF DESCRIPTION OF THE DRAWINGS

FIG. 2 is an elevation view of a rear side of the partition of FIG. 1 as would be seen from the rear seat of the vehicle, also showing an imaginary second support member in dashed lines.

FIG. 3 is an elevation view of a right side (passenger side) of the partition of FIG. 1.

DETAILED DESCRIPTION OF PREFERRED EMBODIMENTS

Figure 1:
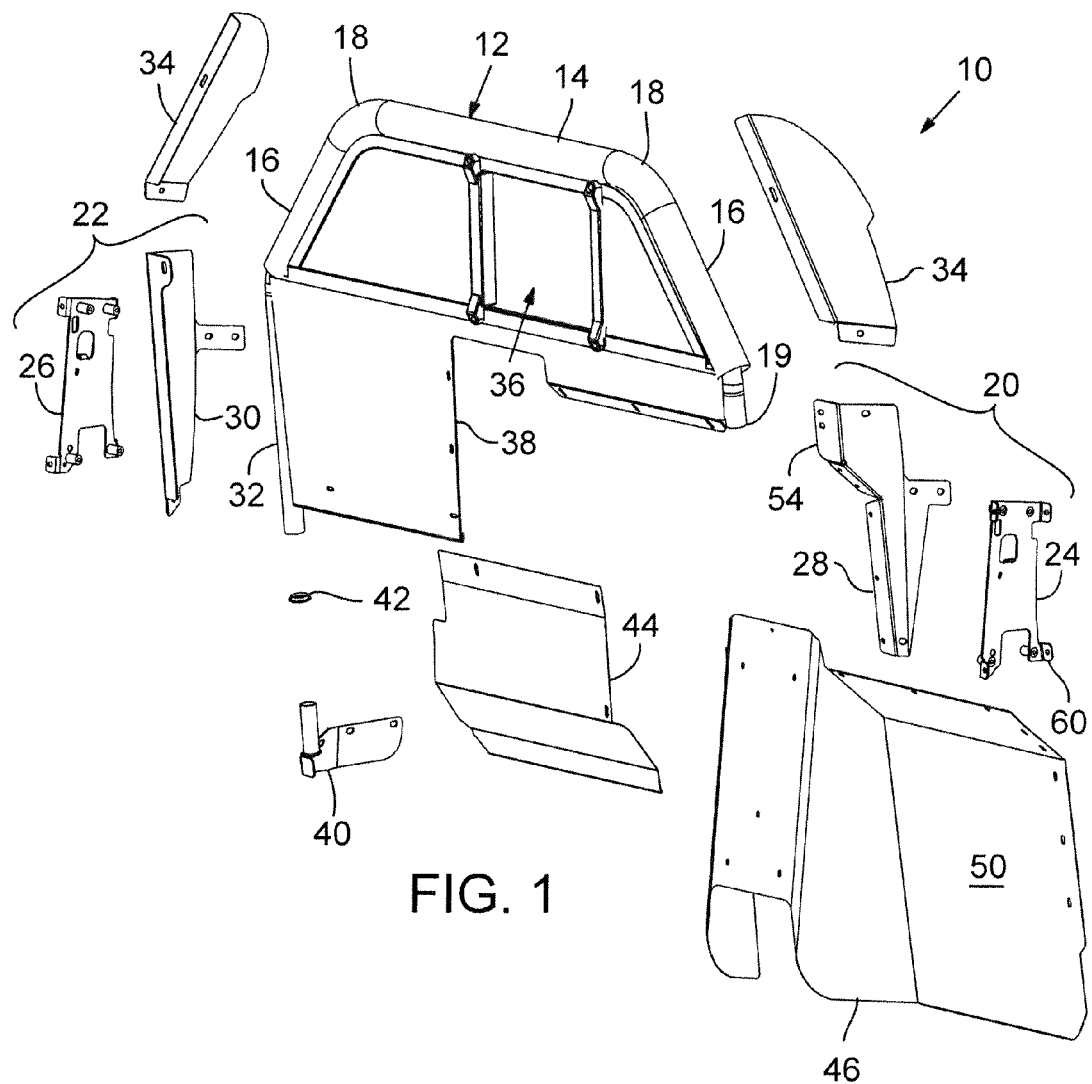
FIG. 1 is an exploded perspective view of an embodiment of the partition providing increased legroom.
Figure 4:
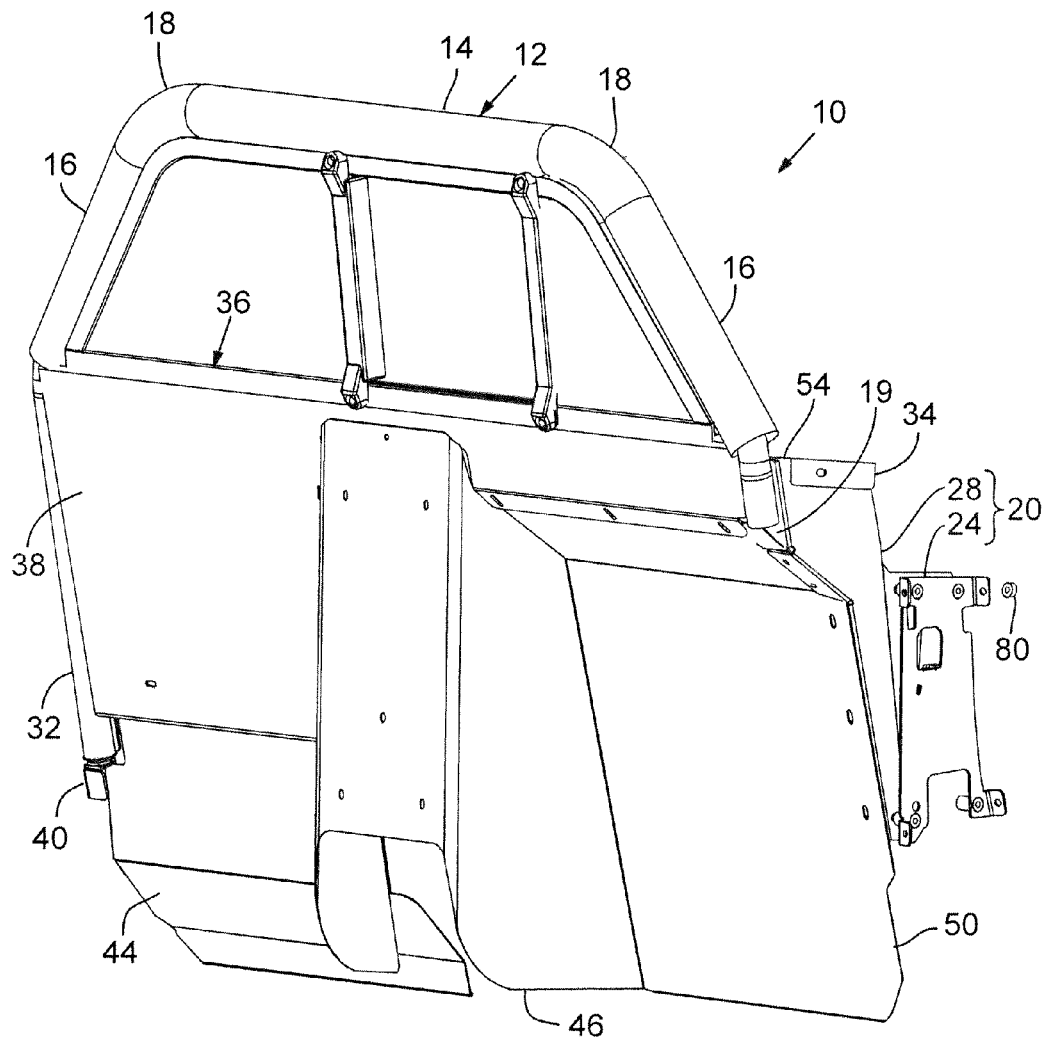
FIG. 4 is a rear side perspective view of the partition of FIG. 1, showing the right side of the partition.
Figure 5:
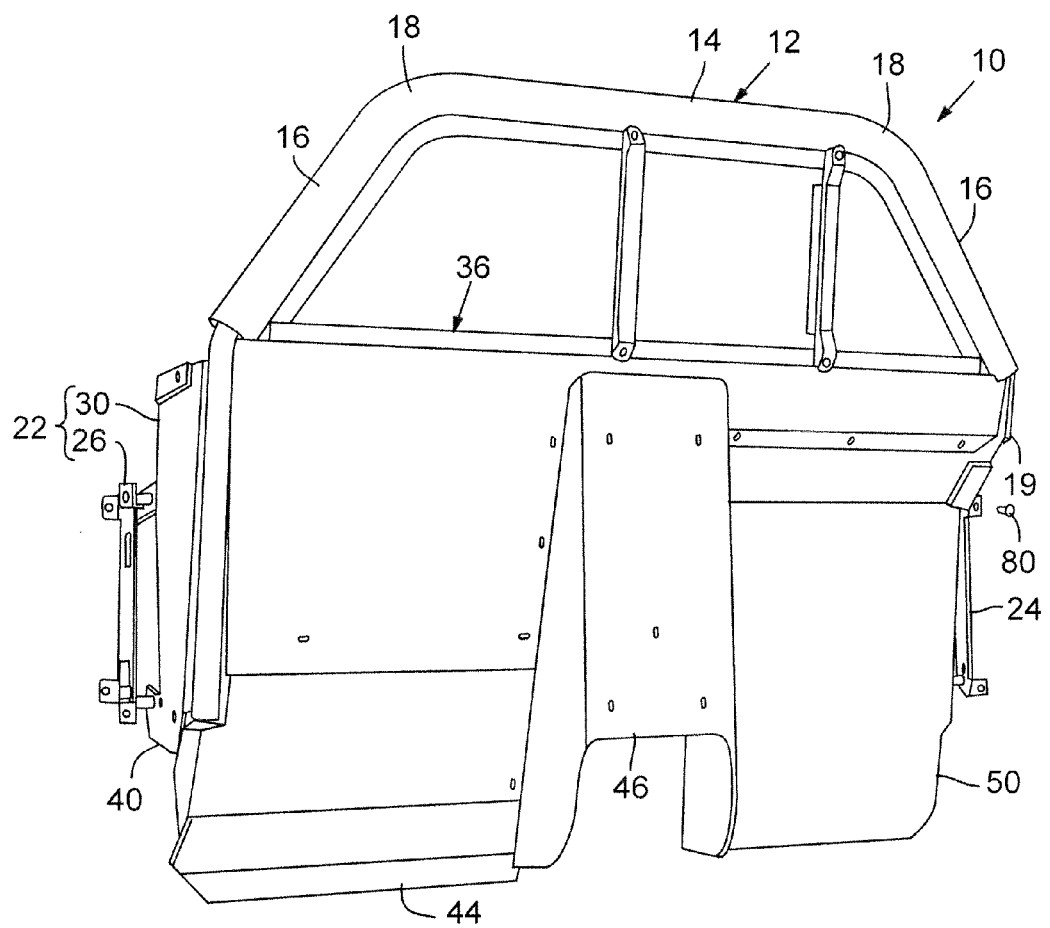
FIG. 5 is another rear side perspective view of the partition of FIG. 1, showing the left side (driver's side) of the partition.

An embodiment of a partition 10 providing increased legroom is shown in FIGS. 1-6. The partition 10 (or partition assembly) includes a partition frame 12 and at least a pair of partition support brackets 20, 22 that couple the partition 10 to a vehicle. In the illustrated implementations, the partition is configured to be coupled to the vehicle's inner surface at approximately the B-pillar of the vehicle, and at a height above the floor pan and door opening (or door sill). In the illustrated implementations, the partition is coupled to the vehicle at a height below the window glass, but in other applications, this connection between the partition and the vehicle may occur at points above the vehicle glass.

The partition frame 12 includes a near ceiling member 14 configured to positioned near the ceiling of the vehicle. The near ceiling member 14 is connected at each end to side members 16 via transition sections 18. For vehicles equipped with side curtain air bags, the side members 16 are configured for positioning at least some distance away from the adjacent surfaces of the vehicle's interior, and the resulting spaces are covered or filled by the panels 34. The panels 34 (or their fasteners) may deform, detach, pivot and/or otherwise change condition to allow the side curtain air bags to operate without impediment when deployed. For example, the panels or their fasteners may be bendable to allow deformation upon deployment of an air bag.

There is a window assembly 36 mounted within the partition frame 12. The window assembly may have one or more movable windows. In some implementations, the lower extent of the partition is defined at about the location of the lower horizontal window frame member.

In the illustrated implementations, the left side of the partition frame 12 includes a vertical support member 32 that extends downwardly from the corresponding side member 16. The vertical support member 32 is coupled to the vehicle by a bracket 40 shaped to receive a tubular end of the vertical support member 32. Although the bracket 40 as illustrated is configured for positioning well above the floor or floor pan level of the vehicle, the bracket 40 and the member 32 protrude into the open space available to a passenger seated behind the driver. There may be a spacer 42 located between the member 32 and the bracket 40. In other implementations, the member 32 and the bracket 40 are formed as a single piece.

At the right side of the partition, the side member 16 terminates at 19, i.e., defining a knee space for an occupant seated in the other rear seat behind the front passenger seat. There is a seat back section 46 that has a center section connected to a left side seat back panel 38 and to a recessed right side seat back panel 50. Although the left side seat back panel 36 is shown as part of the partition frame 12, it can be formed as a single piece. Similarly, although the recessed right side back panel 50 is shown to be formed as a portion of the seat back section 46, it can be formed as a separate piece. The left side may be fitted with a lower extension panel 44 that substantially fills the space between the lower edge of the left side seat back panel 38 and the floor pan of the vehicle.

Conveniently, the seat back panel 38, the lower extension panel 44, the seat back section 46 and the recessed seat back panel 50 can be formed of sheet metal, plastic, or other suitable material. In general, these components do not bear any significant loads.

In FIGS. 2 and 3, an imaginary support member or "leg" L, similar in dimension and position to the support member 32 is shown. Conventionally, known partitions have a generally symmetrical construction, and thus would interpose such a member L (and its corresponding bracket, which is not shown) into the rear seat space, despite other efforts to increase that space (e.g., such as providing the recessed right side back panel 50). It has been discovered, however, that greater legroom and ease of access are achieved if the leg L is eliminated and the load from the partition is instead carried by the bracket 20. Thus, the bracket 20 provides structural support and is the predominate member by which loads are transferred from the partition frame 12 to the vehicle.

The external bracket 28 can be formed with an extension 54 that allows the partition frame 12 (in the area of 19) to be coupled by the internal bracket 24 to the vehicle over a significant setback distance S (FIG. 3) from the axis of the B pillar, which shown by the line B. In various implementations, the setback distance S can be about 3 inches to about 6 inches. In other implementations, depending upon vehicle geometry, the setback distance may be less than 3 inches Because of the extension 54 and the setback distance S, the body 56 of the external bracket component is also configured to fill the gap, i.e., to cover the space between the partition frame and the nearest inner surface of the vehicle. This maintains the integrity of the partition, e.g., in preventing a rear seat occupant from reaching through a gap to access the front seat area.

Figure 6:
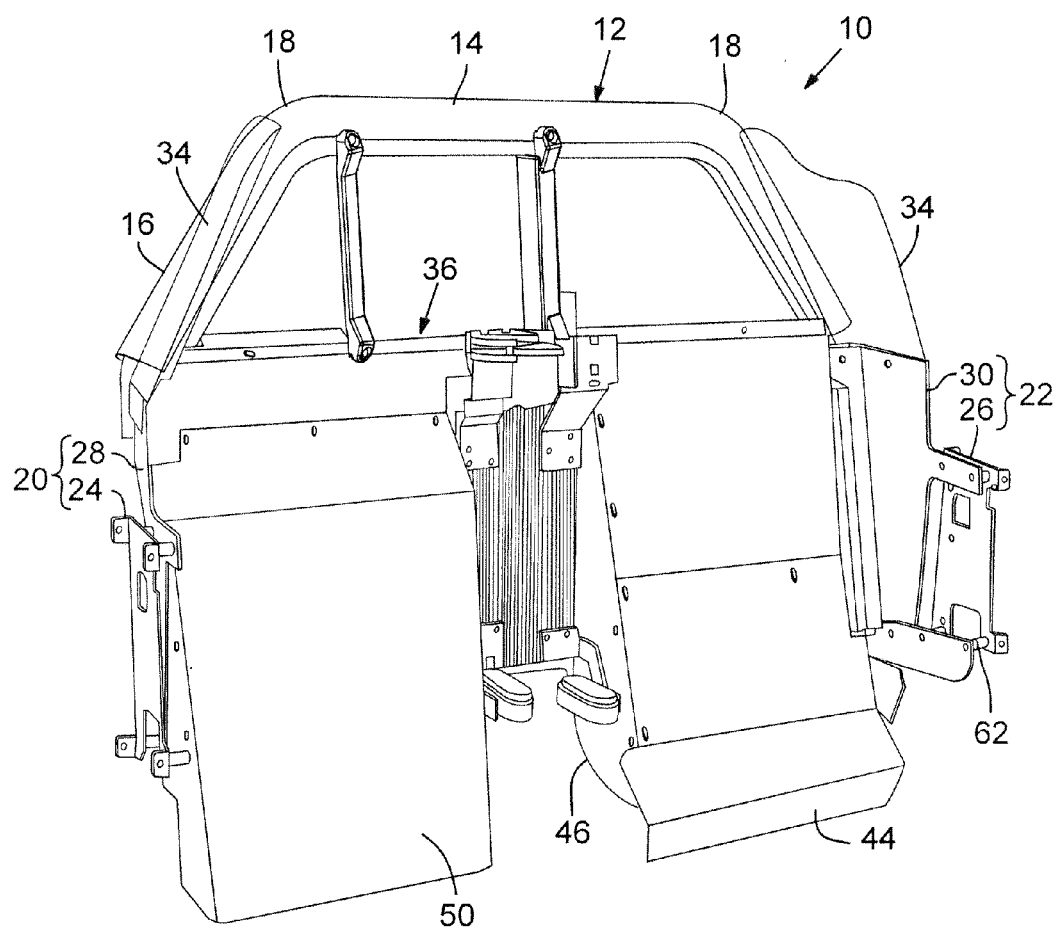
FIG. 6 is a front side perspective view of the partition, also showing an optional gun mount.

The various components may be assembled together using conventional threaded fasteners, such as bolt 80. Referring to FIG. 6, the bracket components 24 and 28, and the bracket components 26 and 30, can be spaced apart so that the vehicle's trim panel can be reinstalled after the respective internal bracket components 24 and 26 are coupled to the vehicle and before the external bracket components 28 and 30, respectively, are connected. Screw bosses 62 are one example of suitable spacers.

The brackets 20, 22 can be formed of any suitable material for carrying the loads transferred from the partition, such as, e.g., 3/16" to 1/4" steel plate. Although the bracket components 26, 30 and 24, 28 are shown as single pieces, any may be formed in multiple pieces, depending upon the specific requirements. Each bracket 20, 22 is attached to the vehicle with at least three fasteners. In general, pairs of fasteners are arranged at approximately the same level. The bracket components can be provided with flanges, such as the flange 60, to make securing the components to each other or to the vehicle more convenient and secure.

Figure 7:
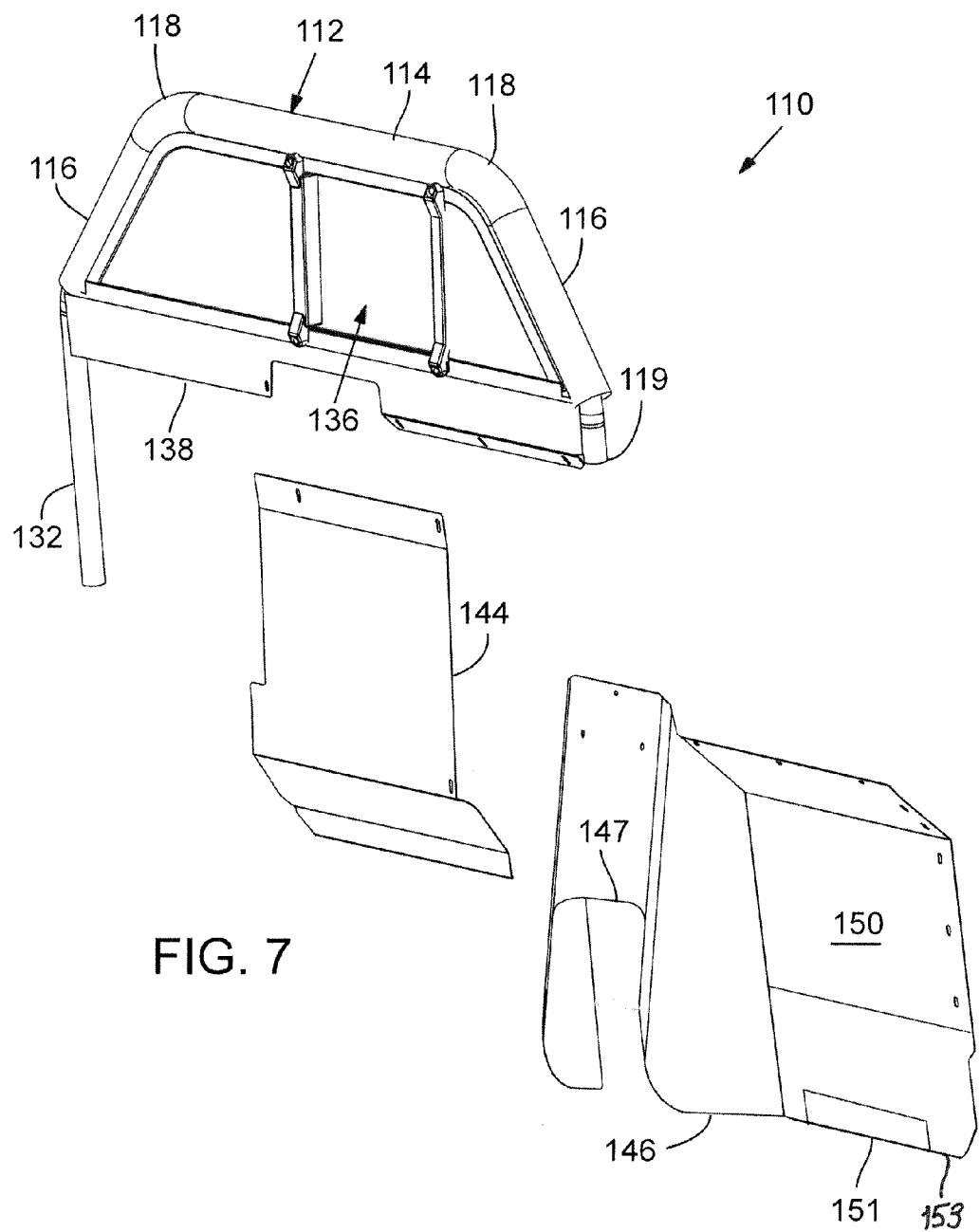
FIG. 7 is an exploded perspective view of a partition similar to FIG. 1, except showing different configurations for several components.

FIG. 7 is an exploded perspective view of a partition according to another implementation viewed from its rear side. The partition 110 is similar to the partition 10 shown in FIG. 1, and like elements have the same reference numbers, plus 100. The differences between the partition 110 and the partition 10 are as follows: (1) the lower extension panel 144 is taller than the lower extension panel 44, (2) the corresponding left side back panel portion 138 does not extend as far below the level of the partition window as in the back panel portion or back panel 38, (3) in the seat back section 146, the lower edge 147 is at a greater height than a corresponding edge in the seat back portion 46, and (4) a foot well 151 with one or more forwardly oriented recesses is provided. The lower extension panel 144 illustrates another example of how in the area behind the driver's seat and between the lower edge of the window and the floor of the vehicle, there can be a single panel, a combination of multiple panels or, in some cases, no panel. Also, the bottom portion of the panel 144 can be formed as shown to conform to the contours of the vehicle's floor pan to prevent gaps, yet extend forwardly to provide as much space in the rear compartment as possible, while still maintaining full adjustability of the driver's seat position. In the same way, the lower edge 147 can be a greater height as shown to conform to a vehicle having a greater vertical feature at that location. The foot well 151 can be formed into a separate panel 153 attached to a bottom edge of the seat back panel 150, or it can be formed as one piece with the panel 150.

Figure 8:
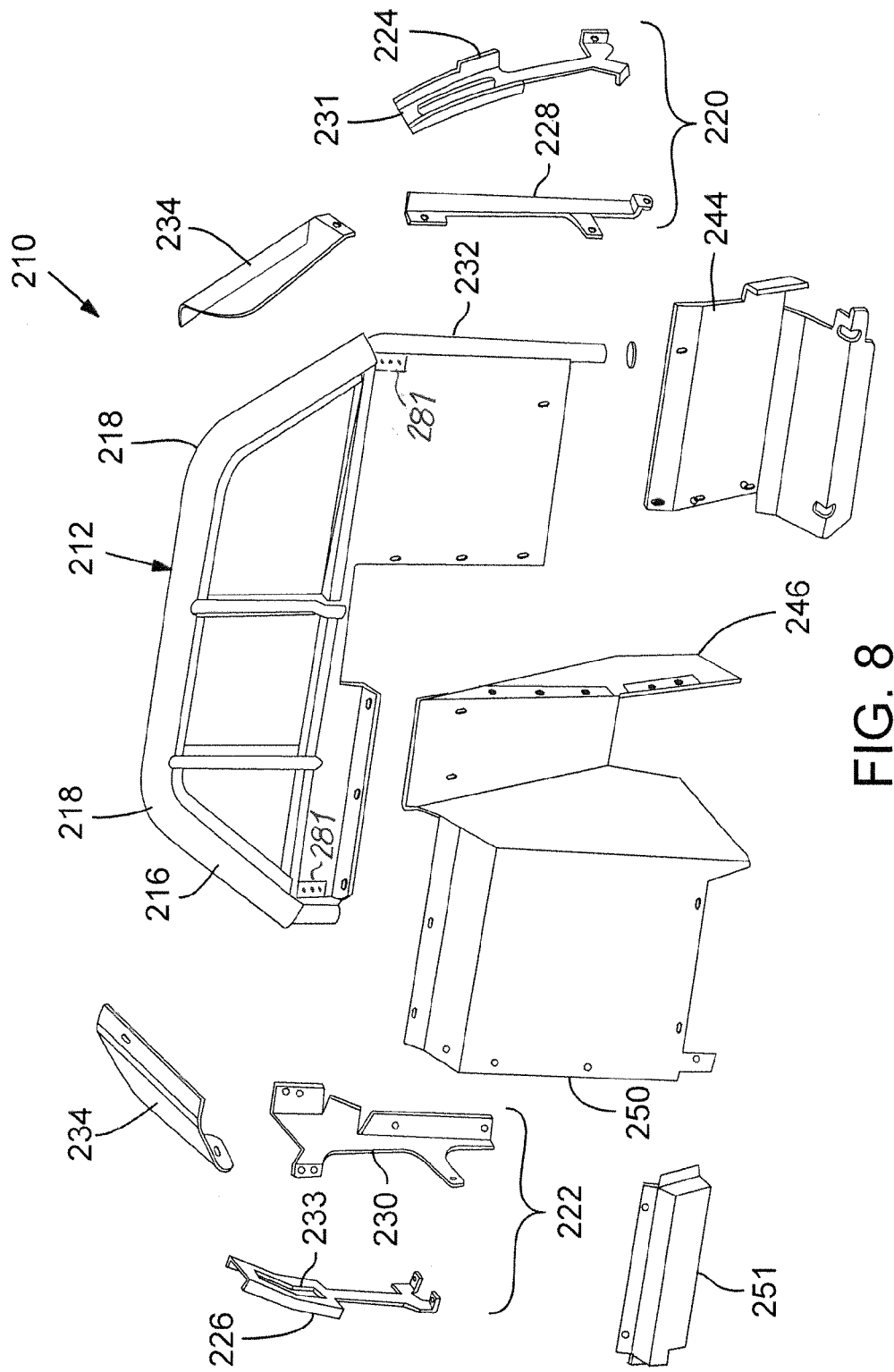
FIG. 8 is a front side perspective view of a partition similar to FIG. 1, except showing different configurations for several components.

FIG. 8 is an exploded perspective view of a partition according to another implementation viewed from its front side. The partition 210 is similar to the partition 10 or the partition 110, and like elements have the same reference numbers as in FIG. 1, plus 200. In the partition 210, the lower extension panel 244 has a geometry configured to follow the contours of a different vehicle's floor pan, and includes a deep recess to receive at least a portion of a rear seat occupant's feet. In the partition 210, the foot well 251 is configured as a separate piece that is attached to the seat back panel 250. FIG. 8 illustrates another example of brackets 224 and 226 having respective openings 231 and 233. The openings 231, 233 are provided to allow the brackets to be installed over projecting elements of the vehicle seatbelt assemblies, which extend through the openings when the brackets are installed, maintaining their full operational capabilities.

Thus, with the illustrated implementations, it is possible to provide a partition that allows for the driver's seat to have full range of motion (translation fore and aft and pivoting of the seat back), even in today's smaller vehicles, ensuring enhanced legroom. At the same time, increased rear seat legroom is provided for one rear seat occupant on the opposite side, i.e., in the seat behind the front passenger seat. (The front passenger seat area is reduced somewhat, but is still fully usable.) By maintaining an open access area, particularly at lower heights where a rear seat occupant needs to move his feet, ingress and egress are improved. Specifically, by minimizing the portions of the partition that would protrude into the forward open area defined by the door opening/door sill and the vehicle's vertical side surface (generally, the vehicle's B pillar), the rear seat occupant can move into and out of the seat without maneuvering his feet around a support member attached to the floor pan or protruding rearward of the seatback and/or striking his knees on the seat back. The open access area as described can provided for one rear seat occupant as shown, or in a full "legless" partition providing increased access for both rear seat occupants.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A partition for separating front and rear occupant areas of a vehicle, comprising:
    at least one partition member having an upper extent comprising a near ceiling member positionable adjacent a ceiling of the vehicle and two lateral extents comprising opposite side members;
    wherein the side members extend downwardly away from the near ceiling member and are both dimensioned to terminate above a knee height as defined by a typical seated rear seat occupant's knees when the partition is installed in a vehicle;
    at least one pair of partition support brackets, the partition support brackets being mountable to opposite sides of the vehicle and to the side members to couple the partition to the vehicle,
    wherein the partition member comprises at least two laterally adjacent panel members extending between the two lateral extents in an asymmetrical configuration, and wherein one of the at least two panel members is recessed forwardly of the near ceiling member relative to the other of the at least two panel members.

2. The partition of claim 1, wherein the at least one bracket comprises an internal bracket component and an external bracket component.

3. The partition of claim 2, wherein the internal bracket component is configured to be mounted to a pillar of the vehicle, and the external bracket is configured for coupling to the internal bracket component.

4. The partition of claim 3, wherein the internal bracket component and the external bracket component together define an intermediate space dimensioned to receive a trim panel for the pillar of the vehicle.

5. The partition of claim 3, wherein the internal bracket component comprises screw bosses for receiving threaded fasteners to couple the external bracket component to the internal bracket component, and wherein the screw bosses are dimensioned to maintain a space between the internal bracket component and the external bracket component.

6. The partition of claim 1, wherein the partition support bracket for the at least one of the sides is a sole load supporting member for partition member forces and other associated forces carried by the respective side of the vehicle.

7. The partition of claim 1, wherein each of the pair of the partition support brackets is a sole load supporting member to transfer forces exerted by the partition to the respective side of the vehicle.

8. The partition of claim 1, wherein the partition support bracket has a generally planar cross-section.

9. The partition of claim 1, wherein at least one of the side members of the partition member is dimensioned to terminate above a knee height when the partition is installed in a vehicle.

10. The partition of claim 2, wherein the internal bracket component is configured for mounting to a B-pillar of the vehicle.

11. The partition of claim 1, wherein at least one of the pair of support brackets defines a large opening.

12. The partition of claim 2, wherein the internal bracket component comprises a body and out turned flanges.

13. The partition of claim 1, wherein the load support section of the at least one of the partition support brackets is shaped to extend over a space between a side surface of the vehicle and the partition member when the partition is installed in the vehicle.

14. The partition of claim 1, wherein the partition member is legless on at least one side.

15. The partition of claim 1, wherein the at least one pair of the partition support brackets is configured to maintain an open feet access area adjacent the recessed one of the panel members when the partition is installed to ease ingress and egress through a door opening for the rear seat occupant.

16. The partition of claim 1, wherein the at least one of the support brackets is configured to support the partition frame spaced rearward of a B-pillar of the vehicle by a greatest distance of about 4 inches to about 6 inches when the partition is installed in the vehicle.

17. The partition of claim 1, wherein the partition support bracket for at least one of the opposite sides comprises a load support section configured to support a proportion of a partition member load as applied to the at least one of the sides.

18. A partition for separating two-passenger front and multiple passenger rear occupant areas of a vehicle, comprising:

a partition frame having an upper lateral member, respective angled side tubular members extending from ends of the upper lateral member, and a window bordered by the upper lateral member and the side members;

one or more panel members configured to fit between the window and a floor pan of the vehicle in a vertical direction and between first and second sides of the vehicle in a horizontal direction; and a tubular extension positionable to support the one of the angled side tubular members for positioning adjacent the first side of the vehicle, the tubular extension member having a lower end configured for coupling to a midsection of the vehicle;

wherein a first of the-panel members is positionable adjacent the tubular extension and generally defines a first member plane approximately parallel to a reference plane defined by the tubular extension and the window;

wherein there is at least a second body panel member positionable laterally adjacent the first panel member and for positioning adjacent the second side of the vehicle, wherein the second panel member has a recessed portion recessed in a forward direction relative to the first panel member to increase space available for a rear seat occupant on the second side of the vehicle, and wherein there is no tubular extension positionable to support the other of the angled side tubular members for positioning adjacent the second side of the vehicle.

\* \* \* \* \*